United States Patent [19]

Chiesa, Jr. et al.

[11] 4,097,305

[45] Jun. 27, 1978

[54] METHOD FOR REMOVING BOT EGGS FROM ANIMAL HAIR

[75] Inventors: Peter J. Chiesa, Jr., Coatesville; Meredith S. Ott, Hatfield, both of Pa.

[73] Assignee: Bickmore, Inc., Hudson, Mass.

[21] Appl. No.: 770,635

[22] Filed: Feb. 22, 1977

Related U.S. Application Data

[63] Continuation of Ser. No. 558,328, Mar. 14, 1975, abandoned.

[51] Int. Cl.² .................... A01K 13/00; B08B 1/00
[52] U.S. Cl. ............................. 134/6; 119/83; 119/156; 119/157; 252/542; 252/DIG. 7
[58] Field of Search ............... 252/DIG. 7, DIG. 13, 252/DIG. 14, 542, 153; 134/6; 119/83, 86, 93, 156, 157; 260/309.6; 548/354

[56] References Cited

U.S. PATENT DOCUMENTS

| 996,221 | 6/1911 | Daly | 119/83 |
|---|---|---|---|
| 2,528,378 | 10/1950 | Mannheimer | 260/309.6 |
| 2,773,068 | 12/1956 | Mannheimer | 252/542 X |
| 2,826,551 | 3/1958 | Green | 252/DIG. 14 |
| 3,092,555 | 6/1963 | Horn | 252/DIG. 13 |
| 3,265,625 | 8/1966 | Grob | 252/DIG. 14 |
| 3,799,119 | 3/1974 | Govoruhk | 119/157 |
| 3,808,311 | 4/1974 | Olson et al. | 252/DIG. 13 |
| 3,870,660 | 3/1975 | Paviak | 252/DIG. 13 |
| 3,882,824 | 5/1975 | Acquaviva | 119/156 |

*Primary Examiner*—S. Leon Bashore
*Assistant Examiner*—Steve Alvo
*Attorney, Agent, or Firm*—Connolly and Hutz

[57] ABSTRACT

Bot eggs are readily removed from horse's hair by first applying to the eggs a thickened aqueous solution of an imidazoline or betaine surfactant in which the hydrophobe is a $C_7$ to $C_{12}$ hydrocarbyl group. This loosens the adhesion of the eggs so they can be scraped off easily, even by the use of a pad of metal wool.

5 Claims, 2 Drawing Figures

METHOD FOR REMOVING BOT EGGS FROM ANIMAL HAIR

This is a continuation of application Ser. No. 558,328, filed Mar. 14, 1975, now abandoned.

The present invention relates to the removal of bot eggs from horse's hair.

Among the objects of the present invention is the provision of novel compositions that assist in removing bot eggs from horse's hair.

Additional objects of the present invention include novel methods for facilitating such removal of bot eggs.

Figure 1:
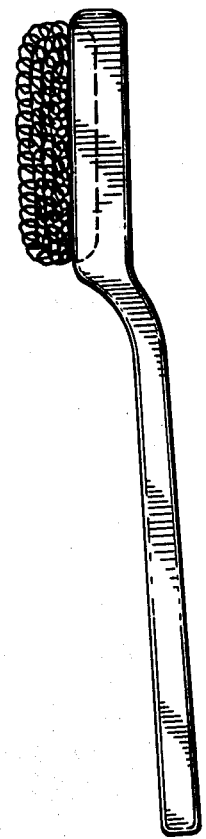
Figure 2:
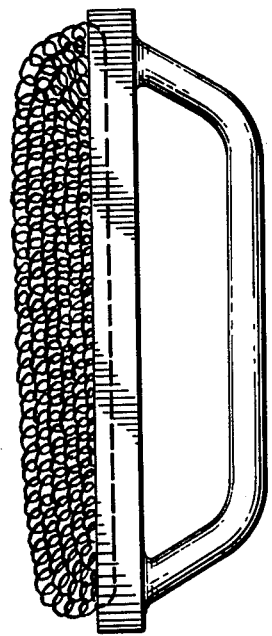

The foregoing as well as further objects of the present invention are more fully discussed in the following description of several of its exemplifications, reference being made to the accompanying drawings in which:

FIG. 1 is a side view of a tool useful for the bot egg removal process of the present invention; and FIG. 2 is a similar view of a modified tool for the same purpose.

Bot flies develop from parasitic larvae that grow on the stomach wall of horses and similar animals, and the presence of such parasites is considered quite harmful. They damage the stomach lining and sometimes cause fatal attacks of colic when they block the valve from the stomach to the small intestine.

The larvae grow from eggs that are laid by the adult bot fly on the horse's hair, generally in the summer and early fall. The licking of these eggs by the horse transfers the hatching larvae to the horse's tongue where they burrow in and live for about a month, after which they emerge and are transferred to the horse's stomach where they live on the stomach lining till early spring. By that time the larval development is complete and they become detached from the stomach, passing out with the feces. There they pupate for about a month until the adult flies emerge. The cycle then repeats.

The bot eggs are very adherent to the hair on which they are laid. The strong adhesion is based in part on the fact that the layer of adherent laid by the bot fly with the egg encircles the hair filament and is of proteinaceous nature like the protein of the hair. The adhered eggs are ordinarily very difficult to remove from the hair and the general practice has been to scrape the egg-containing hair with a razor blade or sharp knife, an operation that generally tears or cuts much of the hair and is quite time consuming.

According to the present invention, there is applied to the egg-containing hair before it is scraped, a thickened aqueous solution containing at least about 2% of an amphoteric imidazoline surfactant or an amphoteric betaine surfactant, in which surfactant the hydrophobe is a $C_7$ to $C_{12}$ hydrocarbyl group. This composition softens the egg-anchoring adhesive and after a few minutes of such softening, the eggs can be scraped off the hair very easily and rapidly with a dull instrument. An egg-scraping operation that requires $\frac{1}{2}$ hour to an hour without the help of the present invention can be completed in five to ten minutes after the composition of the present invention is applied and soaked in for a few minutes.

It is preferred to work the composition into the hair, as by applying it with the fingers, to make sure it reaches the entire surface of every bot egg. This provides the most effective softening action. Also the composition should have a viscosity of at least about 1000 centistokes at ambient temperature, preferably more than 1500 centistokes, so that it does not run down off the horse's body too rapidly, and enough will remain on the eggs for the few minutes needed to produce a highly effective softening.

The pH of the composition of the present invention is preferably from about 6 to about 9.5 to obtain the desired high degree of softening, and most preferably between about 7.5 and about 8. It is also desirable to provide this slight alkalinity by the presence of free ammonia to thereby reduce the content of non-volatile salts.

As thickening agent any material that is not excessively harmful to the horse's skin can be used. Polycarboxylates such as water-soluble carboxymethylcellulose and polymers of carboxy vinyl monomers are suitable, as are natural thickeners such as carregeenin and carob bean gum, but the polycarboxylates seem to improve the softening action.

The amphoteric imidazolines of the present invention preferably have the general formula

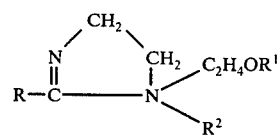

where
R is a hydrocarbyl radical that together with the adjacent "C" constitutes the hydrophobe moiety of the surfactant; and
$R^1$ and $R^2$ are hydrophilic groups at least one of which contains an acid structure such as COOH, $SO_3H$, $CHOHCH_2SO_3H$, or the like, linked in place through a bridge not more than two methylene groups long, or directly connected as shown in the formula.

These surfactants are extremely effective softeners for the purposes of the present invention and are also not irritating to the skin.

The amphoteric betaine surfactants are not as effective as the amphoteric imidazolines, although they can be used and will simplify the bot egg removal in the manner already described. They generally have a hydrophobic hydrocarbyl group on the nitrogen of a cyclic inner salt of an amino acid. The acid group of the amino acid can be carboxy or sulfo, although carboxy is preferred, and the ring of the cyclic salt can be a 4, 5 or 6-membered ring. Typical betaines for the present invention include n-octyl dimethylaminopropane sulfonic acid betaine, 2-(N-octyl-N,N-dimethyl amine) acetic acid betaine,
2-(N-decyl-N,N-dimethyl amine) acetic acid betaine,
3-(N-dodecyl-N,N-dimethyl amine) propionic acid betaine,
3-(N-heptyl-N,N-dimethyl amine) propionic acid betaine
2-[N-(2-hydroxyoctyl)-$N^1$,$N^1$-dimethyl diaminopropane] acetic acid betaine The ionic nitrogens of the betaines are preferably fully alkylated with methyl and/or ethyl groups where those nitrogens are not bonded to the hydrophobe or to the inner salt ring.

A feature of the present invention is the use of surfactants having hydrophobes which are $C_7$ to $C_{12}$ hydrocarbyls, preferably $C_7$ to $C_{10}$ and most preferably $C_8$.

The composition of the present invention can have additional ingredients that do not interfere with the softening action, or even improve it. They can for example contain protein substantive to the horse's hair, and can additionally or alternatively contain gelling agents, defoamer, and even some depilatory. Scenting material can also be included to help offset odors such as that of free ammonia when that is used.

The following examples are illustrative:

EXAMPLE I

To 3,434 mls. of tap water is added 1 ml. of dimethyl silicone oil defoamer followed by 20 mls. of a 30 weight % solution in water of

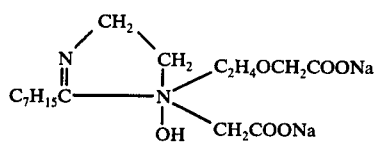

and then 18.4 of the polymeric carboxyvinyl thickener Carbopol 940 produced by B. F. Goodrich Co. The resulting mixture is stirred overnight at medium speed to produce a uniform thick mixture. When this condition is attained an additional 260 mls. of the 30% imidazoline surfactant solution is mixed into the product, along with 30 mls. of a 10 weight % aqueous solution of hair-substantive protein made by hydrolysis of pig collagen and having a molecular weight of approximately 1000. Finally the pH of the composition is brought up to 8.0 with ammonium hydroxide, and it is ready for use. It has a viscosity of about 2000 centistokes at 25° C as measured with a Brookfield Viscometer Model LVT using spindle W.3 at 12 rpm.

The foregoing composition is applied by hand to the egg-containing hairs and worked in so that those hairs have their affected surfaces completely wetted by it. Where there is a substantial egg infestation, the application to all infested areas will take a few minutes so that by the time the application is completed the portions applied first have completed their softening action. The horse's hair at the softened locations can then be scraped with an ordinary serrated kitchen knife or a shedding blade. The scraping requires surprisingly little effort.

Indeed the scraping can be effectively carried out with a pad of metal wool, particularly the type of metal wool in which the metal strands are lathe turnings or the like. Stainless steel is the preferred metal for the metal wool, although bronze can also be used. The metal wool can be in the form of an unsupported pad, but it is preferably mounted on a handle as illustrated in the drawings. Such mounting is conveniently provided by having the handle made of plastic, injection molded into a portion of the pad at relatively low temperature where the plastic flows poorly, while the pad is compressed, so that the plastic does not penetrate the entire pad.

After the scraping is completed the softening composition can be left on the horse's skin, or it can be washed off. A light wash is preferred inasmuch as this leaves some of the substantive protein on the horse's hair and helps heal damage to the hair caused by the bot eggs.

EXAMPLE II

The formulation of Example I is modified by eliminating the protein, substituting the following surfactant:

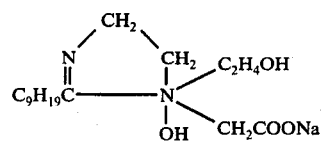

for the one given in Example I, and substituting carboxymethyl cellulose thickener for the carboxyvinyl polymer. The composition thus formed is slightly less viscous than that of Example I, but is used in exactly the same way.

EXAMPLE III

The formulation of Example I is modified by substituting the surfactant:

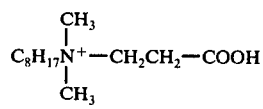

for the surfactant of Example I, substituting a hair-substantive protein hydrolyzate having an average molecular weight of about 2000, for that of Example I, and increasing the amount of thickener to 20.0 grams. This composition is also used in the same way.

EXAMPLE IV

The formulation of Example I is modified by elimination of the defoamer, substituting:

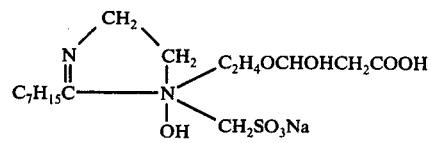

for the surfactant of that example, reducing the surfactant content to 2 weight percent and conducting the stirring at low speed (200 rpm) for 24 hours. The resulting composition is used the same way.

The compounding of the compositions of the present invention is preferably arranged so that the thickening agent, if added as an undissolved powder, is first mixed with water containing at least about 0.1% surfactant. This inhibits lump formation and greatly facilitates the mixing. Excessive foam tends to be produced when mixing with a propeller mixer rotating at speeds of 800 or more rpm, unless a defoamer is present.

By hair-substantive protein is meant partially hydrolyzed protein that is capable of healing minor injuries to hair. While this ingredient is not needed in the composition of the present invention in order to do a satisfactory job of egg-removal, its presence improves the egg-removal operation and leaves the horse's hair in better condition.

Obviously many modifications and variations of the present invention are possible in the light of the above teachings. It is, therefore, to be understood that within the scope of the appended claims the invention may be practiced otherwise than as specifically described.

What is claimed:

1. A method for removing bot eggs from animal hair, which method comprises applying to the hair to soften the cement by which the eggs are adhered to the hair, a thickened aqueous solution containing at least about 2% of an amphoteric surfactant selected from the class consisting of imidazoline surfactants and betaine surfactants and having a hydrophobic $C_7$ to $C_{12}$ hydrocarbyl group, the solution having a viscosity of at least about 1000 centistokes at ambient temperature, and then scraping the hair having the softened adherents.

2. The combination of claim 1 in which the hydrophobe is a $C_8$ hydrocarbyl group and the surfactant concentration is about 2%.

3. The combination of claim 1 in which the applied composition is worked into the hair.

4. The combination of claim 1 in which the scraping is effected with a mass of metal wool.

5. The combination of claim 1 in which the metal of the metal wool is stainless steel.

* * * * *